United States Patent [19]
Dunning et al.

[11] Patent Number: 6,033,748
[45] Date of Patent: Mar. 7, 2000

[54] PLASTICS ARTICLES

[76] Inventors: Peter James Dunning, 25 Apricot Tree Close, Bridgwater, Somerset TA6 4XE; Andrea Sparkes, 34 Knighton Cottages, Burton, Bridgwater, Somerset TA5 1QD, both of United Kingdom

[21] Appl. No.: 08/860,512

[22] PCT Filed: Jun. 17, 1996

[86] PCT No.: PCT/GB96/01434

§ 371 Date: Aug. 13, 1997

§ 102(e) Date: Aug. 13, 1997

[87] PCT Pub. No.: WO97/15627

PCT Pub. Date: May 1, 1997

[51] Int. Cl.[7] .............................. B29C 44/20; B29D 22/00
[52] U.S. Cl. .......................... 428/36.5; 264/45.9; 264/54; 264/321
[58] Field of Search ............................ 264/45.9, 54, 321; 428/36.5, 35.7

[56] References Cited

U.S. PATENT DOCUMENTS

| | | | |
|---|---|---|---|
| 4,145,466 | 3/1979 | Leslie et al. | 264/523 |
| 4,543,383 | 9/1985 | Heil et al. | |
| 4,929,482 | 5/1990 | Moritani et al. | 428/36.4 |
| 5,115,016 | 5/1992 | Dickens et al. | 524/513 |
| 5,362,763 | 11/1994 | Al Ghatta et al. | 264/54 |
| 5,536,793 | 7/1996 | Rotter et al. | 525/437 |
| 5,696,176 | 12/1997 | Khemani et al. | 264/54 |

FOREIGN PATENT DOCUMENTS

| | | |
|---|---|---|
| 0372846 | 6/1990 | European Pat. Off. |
| 59-210955 | 11/1984 | Japan. |
| 384061 | 4/1991 | Japan. |
| 1315488 | 5/1973 | United Kingdom. |
| 9417131 | 8/1994 | WIPO. |

OTHER PUBLICATIONS

Database WPI, Seciton Ch., Week 8503, Derwent Publications Ltd., Class A23, AN 85–015055 (Undated).

Database WPI, Section Ch., Week 9120, Derwent Publications Ltd., Class A23, AN 91–146215 (Undated).

*Primary Examiner*—Allan R. Kuhns
*Attorney, Agent, or Firm*—Mathews, Collins, Shepherd & Gould, P.A.

[57] ABSTRACT

A foamed polyester resin article is made by a method which includes forming a molten resin mixture containing poly (ethylene terephthalate) having an intrinsic viscosity greater than 0.7 and a moisture content of not greater than 0.03%, a melt viscosity modifier which comprises a multi-stage emulsion graft copolymer of methyl methacrylate and a lower alkyl acrylate monomer, and a heat activatable decomposition-type foaming agent. The mixture is heated in the barrel of an extruder and extruded through the die of the extruder. The method can be used to produce extruded poly (ethylene terephthalate) sheet having a foamed structure suitable for subsequent thermoforming into packaging articles and food containers such as those used in dualovenable food trays used for reheating foods in microwave or conventional ovens. The articles produced by the method have a density which may be 35–40% less than that of similar articles made from conventional non-foamed poly (ethylene terephthalate).

10 Claims, No Drawings

PLASTICS ARTICLES

The present invention relates to plastic articles and to a method of manufacturing them. More particularly, it relates to a process for producing extruded poly (ethylene terephthalate) sheet having a foamed structure suitable for subsequent thermoforming into "lightweight" packaging and food containers, especially dualovenable food trays used for reheating food in microwave or conventional ovens.

It is well established that crystalline poly(ethylene terephthalate), CPET, is very suitable for the manufacture of trays and other similar articles which are used in applications such as food containers where it is required to reheat the contents to high temperatures, typically 175° C. to 200° C., and many millions of these are already in use. However, the density of 'solid' CPET trays is high and it is desirable that the density of trays, and hence the weight of material used for their manufacture, is reduced. It is also well-known that by inducing a foaming action into an extrusion process, the density of sheet extruded therefrom is lower than the density of solid (i.e., non-foamed) material. As a consequence of foaming, the amount of polymer resin needed to produce an article having a particular thickness is reduced accordingly. Unfortunately, it is recognised that the foaming action also reduces the melt viscosity of extrudate and this, particularly in the case of PET, causes difficulties in controlling the extrusion process and sheet thickness. The resultant extruded sheet suffers from a lack of consistency and the impact strength of trays and other articles produced from it is usually too low.

EP-A-0372846 claims to overcome these aforementioned difficulties by the incorporation, into the molten polymer resin composition of certain carboxylic acid anhydride branching agents, eg pyromellitic dianhydride. Unfortunately, articles obtained from such compositions tend to have relatively high levels of unreacted branching agents which is undesirable when such articles are intended as food trays. WO 94/17131 discloses the use of a premix concentrate containing polyester and anhydride branching agents in order to overcome this problem of retained unreacted anhydride in the final articles. Although the use of this concentrate does bring about a reduction in the final level of unreacted branching agents, some still remains in the final articles.

An object of the present invention is to eliminate the reliance on acid anhydride branching agents to improve the properties of foamed CPET, particularly the melt viscosity in an extrudate, the consistency and foam structure, such that articles produced have a good compromise of physical properties such as low density and high impact strength.

According to the invention there is provided a method of making a foamed polyester resin article comprising forming a molten mixture containing poly(ethylene terephthalate), having an intrinsic viscosity (I.V.) greater than 0.7 and a moisture content of not greater than 0.03%. a melt viscosity modifier and a heat-activatable foaming agent having a decomposition temperature greater than 150° C. heating the mixture in the barrel of an extruder and extruding the mixture through the die of the extruder to form a foamed extruded product.

We have found that by using the combination of the foaming agent and the melt viscosity modifier we have been able to produce extruded poly(ethylene terephthalate) sheet and food trays formed therefrom having a density which is 35–40% less than that of conventional, non-foamed CPET. The reduction in density represents a saving in the quantity of the polyester resin used in the manufacturing process. Furthermore, the final products do not contain unacceptable acid anhydride branching agents.

The polymer resin used in the present invention is crystallizable poly(ethylene terephthalate), having an intrinsic viscosity (I.V.) greater than 0.7. Poly(ethylene terephthalate) having an I.V. of 0.7 or less is not suitable for use in carrying out the present invention since it is unlikely to provide a high enough level of impact resistance once crystallised to a level which will be sufficient to ensure adequate heat resistance in the final product. Preferably, the PET will have an I.V. of greater than 0.85 such that relatively high impact resistance in the final, crystallised, product can be achieved. The crystallizable PET used will also have, or will be pre-dried to, a moisture content of 0.03% or less by weight of the PET. The presence of moisture at a content above 0.03% has a deleterious effect on the final product since it tends to reduce the I.V. of the PET. Crystallizable PET meeting the requirements described above is available commercially, for example, the PET sold under the brand names "ARNITE A06 700K" (from AKZO Chemie), "TRAYTUF" grades 9506 and 1003 (Shell) and "TENITE" grade 12388 (from Eastman). In the present invention, it is possible to use, as the crystallizable PET, PET recycled from latter stages of the process, such as skeletal forming waste. This "rework" or recycled PET may form up to 100% of the PET component used in the invention. Typically, however, if "rework" PET is used it will be used in combination with "virgin" PET, for example, forming about 50–55% by weight of the total PET component.

The heat activatable foaming agent used in the present invention is a compound or mixture of compounds which undergoes thermal decomposition to generate a gas as a decomposition product. The choice of foaming agent is determined primarily by the processing temperature at which the resin composition is processed in the barrel of the extruder being used although, of course, the foaming agent and its decomposition products must also be compatible with the poly(ethylene terephthalate), the melt viscosity modifier and any other component that might be incorporated into the resin composition to be extruded. To ensure that activation of the foaming agent does not occur during the initial blending operation of the resin composition prior to feeding into the extruder and occurs while the composition is being processed in the barrel of the extruder it is essential that the foaming agent is one with a decomposition temperature greater than 150° C. and up to the maximum temperature that will be achieved in the extruder. Typically, the foaming agent will be one having a decomposition temperature in the range of from greater than 150° to 280° C. Such foaming agents are, of course, well-known per se and specific examples include nitrogen generators such as azodicarbonamide, tetrazoles, for example 5-phenyltetrazole, tetrazines, for example 6-phenyl tetrazine, p-toluene sulphonylsemicarbazide, trihydrazine triazine and carbon dioxide generators such as carbonates and bicarbonates, for example sodium bicarbonate. Foaming agents which tend to produce water during decomposition are not preferred since they introduce problems in controlling the moisture content of the extruded foams. For aesthetic reasons, packaging and trays for food are preferred to be white or cleanly coloured by the use of pigment and for this reason foaming agents which on decomposition produce discolouration of the resin composition, for example azodicarbonamide, are also not preferred. Sodium bicarbonate is our preferred foaming agent because of its relatively low cost, ease of use and because it decomposes cleanly without discolouration of the resin composition. The amount of foaming agent used will, of course, be determined by the level of foaming required in the product. For the production of dual ovenable food trays a typical addition level of foaming agent into the resin composition is from 0.1 to 2.0%, preferably from 0.2 to 0.6% by weight based on the weight of the molten resin composition being delivered by the extruder.

In order to increase the melt strength of extrudate during the extrusion of sheet with a foamed structure we have found it necessary to incorporate into the resin composition, prior to feeding into the extruder, a material which increases the melt viscosity of the extruded product. Examples of materials which are useful in the present invention as melt viscosity modifiers include acrylic modifiers which comprise graft copolymers of methyl methacrylate and lower alkyl acrylate monomers such as butyl acrylate and ethylhexyl acrylate. Such copolymers, prepared by emulsion polymerization techniques, are generally known as multistage polymers and have a basic structure which combines at least one hard non-elastomeric stage with an elastomeric stage. The preparation of such materials does not form part of the invention although reference may be made to U.S. Pat. No. 4,543,383 for details of preparative methods. We have found that we obtain extremely good results by using, as the melt viscosity modifier, a material based on poly (butylacrylate/methyl methacrylate) which is sold by Rohm & Haas under the name "PARALOID EXL-5375" as an impact modifier. In this material the acrylic component is compounded in a polycarbonate shell to improve polyester compatibility. We have, however, ascertained that certain other materials which are conventionally used in the field of polymer processing as impact modifiers do not have the ability to increase the melt viscosity of the extruded product. For instance, polyolefin-based, acrylonitrile butadiene styrene-based and rubber-based impact modifiers are not useful as viscosity modifiers in the present invention since they tend to reduce rather than increase the melt viscosity. The melt viscosity modifier is used in the present invention in an amount which is typically in the range of from 4 to 10%. preferably from 6 to 8%. by weight of the molten resin composition. According to a preferred embodiment, where the extruded material is in the form of a sheet intended for the manufacture of coloured heat-stable food trays, the resin composition further contains one or more pigments.

It is usually the case that a nucleating agent is incorporated into the mixture comprising the crystallizable PET, the melt viscosity modifier and the foaming agent in order to initiate crystallisation in the PET. A separate nucleating agent may not, however, be required in the event that one or more of the other components in the mixture has nucleating activity. For instance, the viscosity modifier "PARALOID EXL 5375", mentioned above, has nucleating activity and a separate nucleating agent may not be required when this modifier is used in carrying out the present invention. The PET sold under the name "ARNITE A06 700K" is provided with a suitable nucleating agent. In cases where a separate nucleating agent is incorporated into the composition to be fed to the extruder this will typically comprise a low molecular weight polymer, eg high density polyethylene, which is compatible or semi-compatible with PET such that it does not separate from the PET during processing. Nucleating agents are commercially-available materials. In general, when a separate nucleating agent is used, the amount incorporated into the mixture of the other components will be in the range of from 1 to 3% by weight based on the PET.

In the production of the poly(ethylene terephthalate) foams according to the present invention the blend of polyester resin, foaming agent, melt viscosity modifier and any other components incorporated is fed to an extruder and after processing therein is extruded therefrom through the extruder die into a region of pressure lower than the pressure in the extruder. The choice of extruder is not critical to the performance of the invention. Extruders conventionally used for extruding PET include single screw extruders and multiple screw extruders. For the production of a foamed PET sheet a flat die will be used although other dies may be used when foam in a different shape is required. The resin composition while resident in the extruder will be heated to an elevated temperature. Typical barrel temperatures used are in the range of from 260° C. to 300° C., preferably 270° to 280° C., to achieve a melt temperature of 280° to 290°.

In the extrusion stage, the temperature of the die will be maintained at a level close to the temperature of the barrel in order to ensure fluid flow therethrough. Typically, this temperature will be in the range of from 250° C. to 270° C. Control of the temperature in the extruder and at the die ensures that the melt viscosity of the extrudate is maintained at a consistent level and that the subsequent foaming of the composition as the composition is extruded is uniform. In the case where the composition is extruded in sheet form, the above control will further ensure that the sheet gauge is consistent.

It is within the scope of the present invention to produce a layered structure of a non-foam film or sheet and foam sheet. Food trays conventionally have an amorphous layer of polymer provided on the crystalline PET sheet since this makes it possible, after the food contents have been introduced into the tray, to seal the contents in the tray by means of a suitable heat-resistant plastics film which is heat sealed to the amorphous polymer layer at the edge of the tray. The amorphous layer is required since the surface of the CPET layer does not soften sufficiently to allow sealing with a sealing film to occur. This also provides a continuous non-foamed surface for product integrity to prevent any leakage of fluid contents through the tray. The layered structure of non-foam film and foam sheet may be produced according to techniques conventionally used in the art of making food trays. For instance, the non-foam film can be co-extruded with the foam sheet, with the non-foam resin composition and the foam resin composition being guided, from separate extruders, to the same one die where they combine to form, on exiting the die, an extruded layered structure. A different method of making the layered structure involves preparing the non-foam film and the foam sheet separately and passing the two through a pair of rollers to laminate them. In the manufacture of dual ovenable food trays the non-foam film or sheet typically comprises amorphous PET.

To make an article from a foamed CPET sheet, with or without a non-foam layer, the sheet is reheated and thermoformed using a forming tool into the desired shape according to known techniques.

In the following Examples, the melt viscosity modifier used (if required) was "PARALOID EXL 5375" from Rohm & Haas. This material contains poly(butyl acrylate/methyl methacrylate) 25852-37-3 and, in addition, contains a modified phenyl phosphite stabiliser, hydrous silicate antiblocking agent, a modified acrylic ester of pentaerythritol and has a Bisphenol-A polycarbonate compound shell. In this material, the two-stage acrylic component comprises 94–97% by weight, the Bisphenol-A polycarbonates and then hydrous silicate together comprise 3–6% and the other additives are present at levels of less than 1%.

EXAMPLE 1 (COMPARATIVE)

Predried crystallizable poly(ethylene terephthalate) ("ARNITE A06 700K White" from Akzo Chemie) was fed to a WELEX 90 mm extruder set up using the conventional temperature profile for solid CPET (300° C.–275° C. at the die) and a gear pump speed of 56 rpm delivering a flow rate of 350 Kg/hr. Citric acid/sodium bicarbonate CPET foaming agent ("Hydrocerol HK70" from Boehringer Ingelheim KG—having a decomposition temperature of 140° C.) was added to the CPET from a metering device "Drimeter" at 50° C. in an amount of 0.6% by weight based on the CPET. The addition of the foaming agent caused an immediate drop in melt pressure of the composition from 1800 psi to 930 psi and the extruder was slowed down to 45 rpm to prevent low-pressure shut-down. The processed composition from the main extruder was coextruded with a 6% layer of amorphous poly(ethylene terephthalate) ("DO4300" from AKZO Chemie), to give a two layer structure.

The extruded two layer structure had a gloss lower surface (CPET) and a matt upper surface (APET). This indicated that the CPET layer was probably inadequately foamed and that the APET layer had merged into the CPET layer. Little or no density reduction was measured in the extruded sheet indicating that there was little foaming of the CPET layer.

Our conclusion is that it is not possible to produce foamed CPET sheet on the WELEX extruder using a foaming agent having a decomposition temperature less than 150° C.

EXAMPLE 2 (COMPARATIVE)

CPET ("ARNITE A06 700K White") was fed to a WELEX 90 mm extruder with 65 mm coextruder having a temperature of 300° C. (275° C. at the die) and the die temperature was then dropped by 15° C. The melt pressure was determined as 1350 psi. The machine speed was set at 56 rpm and the sheet gauge was set at 500 μm. A citric acid/sodium bicarbonate CPET foaming agent having a decomposition temperature of approximately 190° C. ("Hydrocerol HK40B" from Boehringer Ingelheim KG) was added at a dosage rate of 1.2% by weight based on the weight of CPET. On the addition of the foaming agent the melt pressure dropped to about 690 psi. Foaming in the extruded sheet was observed at the extruder die and the rolling bank of extruded material in the nip rolls became irregular. The foamed sheet was coextruded with a 10% layer of "DO4 300" APET. The die temperatures were lowered to 260° C. and the melt pressure was maintained at above 700 psi. The relative density of the sheet was found to vary between 0.95 at smooth regions located in the middle of the extruded sheet and 1.29 at rough regions located at the edges of the extruded sheet. The sheet was thermoformed into food trays which were subsequently tested for intrinsic viscosity (I.V.), ovenability, heat sealing and low temperature impact strength. Ovenability and heat sealing were found to be similar to standard (i.e., solid) CPET but the impact strength was very low and the I.V. showed a drop of 0.39 through the extruder. Normally an I.V. drop of only about 0.05 would be expected for controlled extrusion.

Our conclusion is that, although it was possible to produce a foamed CPET sheet by the method described above the sheet obtained is very inconsistent and of poor appearance and impact strength. The inconsistency of the foaming was, we believe, due to a reduction in melt strength of the polymeric composition as shown by the reduced I.V.

EXAMPLE 3 (COMPARATIVE)

Recycled CPET (with no virgin CPET) was fed to a WELEX 90 mm extruder with 65 mm coextruder with the extrusion conditions used being those normally used for CPET extrusion. Acrylic modifier ("PARALOID EXL 5375") was metered into the CPET from a "Drimeter" at 50° C. Separate trials were carried out using dosages of the modifier set at 0%, 6%, 8% and 10% by weight based on CPET. The I.V. of the recycled CPET was 0.78–0.81 and the sheet gauge was set at 500 μm. The sheet produced was coextruded with a 10% layer of DO4 300" APET to form a laminated sheet. The sheet was thermoformed into food trays and these were tested for I.V. using a Davenport melt viscometer, and impact performance.

The impact performance was measured using the Dynatup apparatus at three temperatures: 23° C., 0° C. and −20° C. The conditions of Dynatup testing were:

RESULTS

| Level of Modifier | 0% | 6% | 8% | 10% |
|---|---|---|---|---|
| I.V. of trays | 0.79 | 0.81 | 0.866 | 0.837 |
| Increase in I.V. | None | ~0.02 | ~0.07 | ~0.04 |
| Total Energy at 22° C. (J) | 2.44 | 2.54 | 3.03 | 3.15 |
| Total Energy at 0° C. (J) | 1.02 | 1.11 | 2.18 | 1.06 |
| Total Energy at −20° C. (J) | 0.67 | 0.95 | 1.56 | 0.923 | weight 2.56 kg
height 80 cm
velocity 3.8 m/s
impact energy 18 J

Our conclusion is that adding the modifier up to a level of at least 8% causes an increase in the impact resistance of the trays especially at low temperatures as would be expected. However, an addition level of 10% modifier appears to begin to reduce the impact strength again, although it still produces tougher trays than at a 6% addition level. This is an effect commonly seen with impact modifiers: they have a critical addition level above which no further improvement is seen.

An unexpected effect of this particular modifier in CPET is that it appears to cause an increase in the melt viscosity of the polymer resulting in higher I.V. measurements than would be expected. Normally an I.V. drop of approximately 0.05 would be expected during extrusion under controlled conditions but, on addition of the modifier, the I.V. appears to rise. This apparent rise in I.V. is approximately proportional to the increase in impact resistance.

EXAMPLE 4

Using the extruder and extrusion conditions described in Example 2, with the exception that the die temperature was 250° C. and the gear pump speed was 45 rpm, foamed CPET sheets were produced from each of the following formulations:

(A) 91.1% by weight of CPET (Akzo "ARNITE A06-700K"), 0.4% by weight foaming agent ("Hydrocerol HK40B") and 8.5% by weight acrylic modifier ("Paraloid EXL 5375").
coextruded with a 10% layer of APET (AKZO "ARNITE DO4-300").

(B) 93.6% by weight CPET ("ARNITE A06-700K"). 0.4% by weight foaming agent ("Hydrocerol HK40B") and 6.0% by weight of acrylic modifier ("Paraloid EXL 5375").
coextruded with a 10% layer of APET ("ARNITE DO4-300").

The two different formulations (A) and (B) above were run, each in two gauges (500 μm and 600 μm). Formulation (A). using 8.5% modifier, gave a 42% density reduction and formulation (B), using 6.0% modifier, gave a 34–37% density reduction.

The sheet was of much better appearance and consistency than that obtained in Example 2, as determined by microscopic examination. Specifically, the sheet surfaces were both smooth. The APET layer was distinct and the foam structure was uniform.

All four rolls of extruded sheet were successfully formed on an Illig RDKP thermoformer, at standard output rate using a tool temperature of 190° C., into food trays of good appearance. The foamed sheet required much less heat for forming than standard CPET thus giving an energy (cost) saving.

The trays were sealed at 190° C. for 4 seconds with both peelable lidding film and weldable lidding film. In all cases the heat seal strength exceeded the peel strength (for peelable film) and the burst strength (for weldable film). All trays sealed well. The trays formed from 600 μm sheet were more impact resistant than those from 500 μm sheet although there was very little difference between impact resistance for sheets of the same gauge containing different levels of modifier.

EXAMPLE 5

Using the extruder and extrusion conditions and formulation (A) described in Example 4, foamed CPET sheets were produced from both virgin material and material containing 45% by weight of recycled foamed CPET.

Both materials were extruded in 600 μm gauge: the virgin material gave a 40% density reduction and the material containing recycled foamed CPET gave a 40 to 47% density reduction.

Both rolls of extruded sheet were thermoformed on an Illig RDKP thermoformer, under the same conditions as described in Example 4 into food trays of good appearance.

The trays were tested for heatsealability (with both peelable and weldable lidding films), leakproofness (at ambient and oven temperatures), dual ovenability and low temperature impact strength.

All of the trays gave excellent results for heatsealability, leakproofness and ovenability and exhibited good impact resistance. The impact resistance of the trays containing recycled material was very similar to that of the trays made from virgin material.

Our conclusion is that foamed CPET may be produced using this invention containing at least 45% of recycled foamed CPET with no resultant loss in tray performance.

We claim:

1. A method of making a foamed polyester resin article comprising the steps of:

forming a molten mixture containing poly(ethylene terephthalate) having an intrinsic viscosity (I.V.) greater than 0.7 and a moisture content of not greater than 0.03%, a heat-activatable foaming agent having a decomposition temperature greater than 150° C. and a melt viscosity modifier comprising a multi-stage emulsion graft copolymer of methyl methacrylate and a lower alkyl acrylate monomer;

heating the mixture in a barrel of an extruder; and extruding the mixture through the die of the extruder to form a foamed extruded product.

2. A method according to claim 1, wherein the poly (ethylene terephthalate) has an intrinsic viscosity (I.V.) greater than 0.85.

3. A method according to claim 1, wherein the heat-activatable foaming agent has a decomposition temperature in the range of from greater than 150° C. to 280° C.

4. A method according to claim 1 wherein the heat-activatable foaming agent is sodium bicarbonate.

5. A method according to claim 1, wherein the extruder, during the extrusion stage, is operated at a barrel temperature in the range of from 260° C. to 300° C. and the die temperature is in the range of from 250° C. to 270° C.

6. A method according to claim 1, wherein a non-foam film or sheet is co-extruded or laminated with the foamed extruded product.

7. A method according to claim 1, wherein the extruded product is subsequently reheated and then thermoformed into an article having a desired shape.

8. A method according to claim 7, wherein the article is a food tray.

9. A food tray wherever produced by the method claimed in claim 7.

10. A method of making a foamed polyester resin article comprising forming a molten mixture containing poly (ethylene terephthalate) having an intrinsic viscosity (I.V.) greater than 0.7 and a moisture content of not greater than 0.03%, a melt viscosity modifier and a heat-activatable foaming agent having a decomposition temperature greater than 150° C., heating the mixture in the barrel of an extruder and extruding the mixture through the die of the extruder to form a foamed extruded product, wherein the poly (ethylene terephthalate) has an intrinsic viscosity (I.V.) greater than 0.85, wherein the melt viscosity modifier is a multi-stage emulsion graft copolymer of methyl methacrylate and butyl acrylate.

* * * * *